United States Patent [19]

Takeda

[11] Patent Number: 5,287,798
[45] Date of Patent: Feb. 22, 1994

[54] HIGH-TEMPERATURE DRY STEAM COOKING UTENSIL

[75] Inventor: Teruhiko Takeda, Toyonaka, Japan

[73] Assignee: San Shokuzai Co., Ltd., Osaka, Japan

[21] Appl. No.: 52,643

[22] Filed: Apr. 23, 1993

[30] Foreign Application Priority Data

Mar. 5, 1993 [JP] Japan .................................... 5-071171

[51] Int. Cl.⁵ .................... A47J 27/00; A47J 27/04; A47J 37/00; A47J 37/06
[52] U.S. Cl. ...................... 99/413; 99/417; 126/369
[58] Field of Search .............. 99/403, 408, 410–418, 99/448, 450; 126/369, 348, 377; 210/464, 465, 468, 469, 473–475, 477; 219/401, 385; 220/428, 23.83, 912; 426/510, 511, 523

[56] References Cited

U.S. PATENT DOCUMENTS

| 472,002 | 3/1892 | Ross et al. | 126/369 |
| 1,263,004 | 4/1918 | Tollagsen | 99/413 |
| 1,375,028 | 4/1921 | Tollagsen | 126/369 |
| 1,462,275 | 7/1923 | Gammel | 126/369 |
| 1,648,725 | 11/1927 | Endicott | 220/428 |
| 2,622,591 | 12/1952 | Bramberry | 126/369 |
| 4,401,017 | 8/1983 | Feld | 99/413 |
| 4,462,308 | 7/1984 | Wang | 426/510 |
| 4,604,989 | 8/1986 | Kita | 220/428 |
| 4,626,352 | 12/1986 | Massey et al. | 210/469 |
| 4,739,698 | 4/1988 | Allaire | 99/417 |

FOREIGN PATENT DOCUMENTS

964878 3/1975 Canada .................................... 99/413

Primary Examiner—Timothy F. Simone
Attorney, Agent, or Firm—Koda and Androlia

[57] ABSTRACT

Disclosed is a high-temperature dry steam cooking utensil which heats and cooks cooking material in a variety of cooking methods like boiling and frying using high-temperature dry steam in an efficient manner without losing moisture and nutrients of the cooking material while preserving the food's own flavor. The high-temperature dry steam cooking utensil comprises a cooking pan for containing water, a tray having a flange for accommodating thereon cooking material, a steam baffle for covering the tray, and a lid for covering the cooking pan. The top portion of the cooking pan is formed of stepped portions for receiving the tray, the steam baffle, the lid. Steam paths are formed between the peripheral of the tray and the inner wall of the cooking pan by cutting partially the stepped portion. Steam generated in the cooking pan is heated in the space between the tray and the inner wall of the cooking pan to a high-temperature dry state. The high-temperature dry steam is then squirted upward out of the steam paths, and the guided toward the cooking material in the tray by the steam baffle.

7 Claims, 7 Drawing Sheets

HIGH-TEMPERATURE DRY STEAM COOKING UTENSIL

BACKGROUND OF THE INVENTION

1. Field of the Invention

The present invention relates to a high-temperature dry steam cooking utensil which generates high-temperature dry steam and uses it to perform a variety of cooking such as boiling, steaming or warming materials to be cooked, thawing frozen foods, and steaming vegetables without adding water, in an efficient and quick manner.

2. Description of the Prior Art

As a cooking utensil which makes the use of steam to prepare foods, the steamer has been widely known which comprises a cooking pan for containing water to heat it into steam and an tray for accommodating thereon cooking material. Japanese Utility Model Laid-Open Publication No. SHO 59-181069 discloses a simple-structured pan, working as a steamer, comprising a cooking pan which contains water to heat it into steam, a tray-like receptacle fitted into the cooking pan and a lid, wherein the receptacle has, on its side, a number of perforations for steam passage.

In conventional steamers and the pan usable as a steamer disclosed in Japanese Utility Model Laid-Open Publication No. 59-181069, steam generated inside the cooking pan, in a wet steam state, is directly fed to a receptacle portion loaded with cooking material, and supplied heat by steam performs cooking. Steam which was used to heat the cooking material immediately condenses into water, which may stick to the surface of the cooking material, or accumulate in the receptacle. As a result, the cooked food may become excessively moisture-laden. Conventional steamers or steam cooking utensils are thus not applied for boiling or frying foods.

A simple pan or frying pan which is directly set on flames has been conventionally used to perform boiling and frying. In such a cooking utensil, the cooking material is often subjected to excessive heat, and is scorched particularly on its portion in direct contact with the bottom of the pan. The top portion of the cooking material is openly exposed, and thus moisture of that portion is evaporated. Furthermore, vital substances human beings need, such as magnesium, calcium and vitamins will be destroyed or dispersed. Such a cooking utensil could use otherwise unnecessarily large quantity of water which could be contaminated with any toxic substances.

In an attempt to eliminate the disadvantage of the prior art, the inventor has tried to modify a cooking utensil comprising a cooking pan for containing water, an tray housed inside the cooking pan, and a lid, by providing perforations on the side of the tray, but still without a fruitful result. In the course of this activity, however, the inventor has invented a new cooking utensil which is capable of heating and cooking efficiently cooking materials intended to be boiled or fried in the manner by which the conventional steamers cannot cook. The new cooking utensil allows cooking materials to be cooked by making an efficient use of moisture which the cooking material itself contains. Also, the new cooking utensil will not destroy useful food ingredients in the course of cooking.

SUMMARY OF THE INVENTION

The present invention comprises a cooking pan 1 for containing water, an tray 2 having, at its entire top circular edge, a flange 2a projected externally and inclined downward, for accommodating thereon a cooking material A, a lid 3 for covering the cooking pan 1 from above, and a steam baffle 4.

The top portion of the cooking pan 1 is formed of, in the ascending order with the cooking pan in normal upright position, a stepped portion 5 for receiving the rim of the tray 2, a stepped portion 6 for receiving the steam baffle 4, and a stepped portion 7 receiving the lid 3. When seated, the tray 2 forms around its circular edges a plurality of steam paths 8 along with cutout portions formed on the stepped portion 5 of the cooking pan 1. The steam baffle 4 is provided with guide segments 4a to guide steam passing out of steam paths 8 toward the cooking material A accommodated in the tray 2.

When water is boiling in the cooking pan 1, evaporated steam rises in the space between the cooking pan 1 and the tray 2. The outer circular wall of the cooking pan 1 may be heated above 100° C. by external heating means. Wet steam at 100° C. rises in the space 9 between the outer circular wall of the tray 2 and the inner circular wall of the cooking pan 1. In the course of this movement in the space 9, the hot cooking pan 1 further heats the steam to 110° to 130° C., causing it to change to high-temperature dry steam which is squirted upward out of the steam paths 8. The squirted high-temperature dry steam is then guided to the cooking material in the tray 2 by the steam baffle, thereby heating the cooking material. As a result of heating, the steam loses some heat, and then pushed upward and flows above the steam baffle toward its circular edge. In the course of this movement, the steam changes into waterdrops or wet steam. They are fed back into the cooking pan.

The waterdrops or wet steam fed back are then mixed with water or wet steam existing in the cooking pan, to be again heated in the space 9 to high-temperature dry steam.

Both the temperature of the atmosphere surrounding the cooking material A and the temperature of the cooking material A itself are kept at the temperature of steam, and the cooking material A is heated and cooked by the saturated high-temperature dry steam which comes in from the entire circular edge of the tray; thus, neither steam condensation nor evaporation of moisture of the cooking material takes place.

DETAILED DESCRIPTION OF THE PREFERRED EMBODIMENTS

Figure 1:
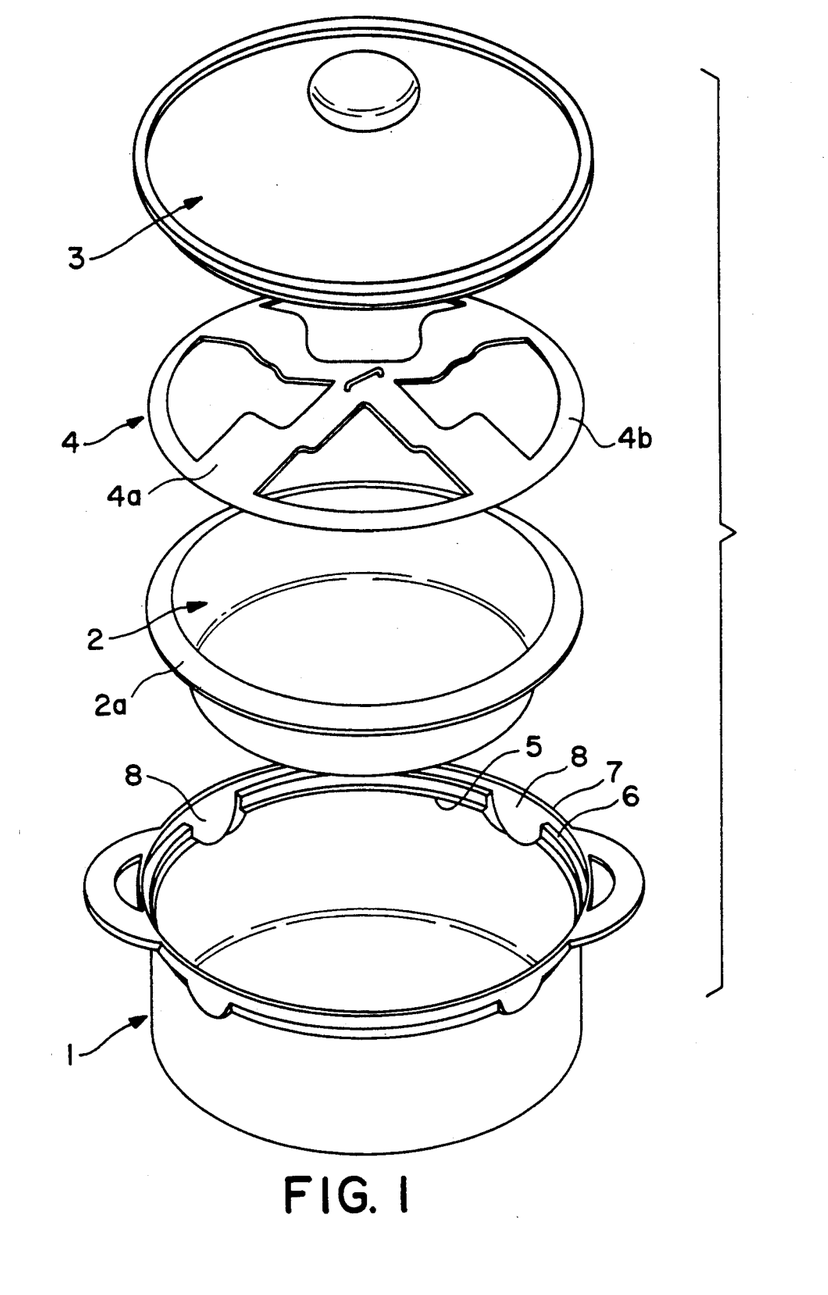
FIG. 1 is an exploded, perspective view of an embodiment of the high-temperature dry steam cooking utensil according to the present invention.

Referring to the drawings, a high temperature dry steam cooking utensil according to the present invention is now described. FIG. 1 is a general exploded, perspective view of the cooking pan. The cooking utensil according to the present invention comprises a cooking pan 1 for containing water, an tray 2 having, at its top circular edge, a flange 2a which is projected externally and inclined downward, for accommodating thereon a cooking material A, a steam baffle 4 disposed above the tray 2, and a lid 3 for covering the cooking pan 1.

Figure 10:
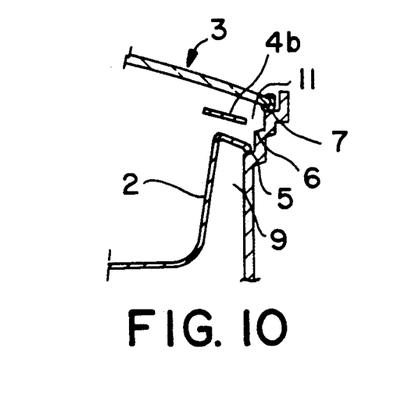
FIG. 10 is a partial vertical cross-sectional view, taken along a section of a portion in which no steam paths lie, of the embodiment of the steam baffle shown in FIG. 8.

Provided on the top portion of the cooking pan 1 are, in the ascending order, a stepped portion 5 which receives the rim of the flange of the tray 2 and another stepped portion 6 which receives the steam baffle 4 and a third stepped portion 7 which receives the lid 3. In the embodiment illustrated in FIG. 1, the stepped portion 7 is serves as the top edge of the cooking pan 1, and the lid 3 properly fits into the cooking pan 1 in a plug-into-socket fashion. Alternatively, however, the stepped portion 7 may be formed at a different level below the top edge of the cooking pan 1 as shown in FIG. 10, and then the stepped portion 7 may receive the lid 3.

Figure 2:
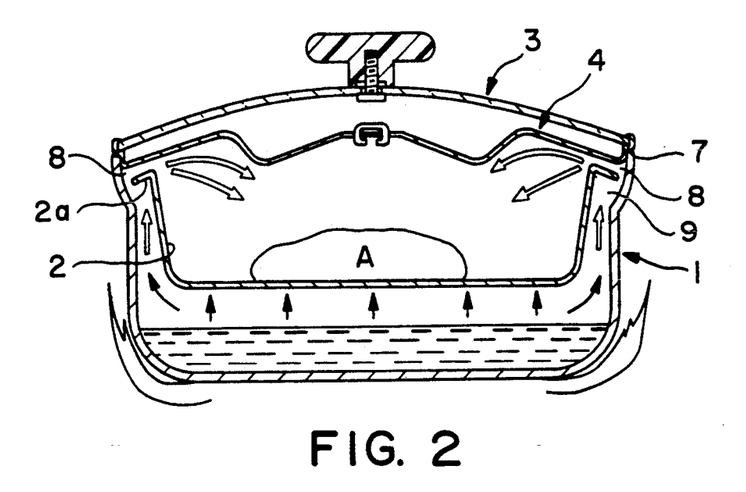
FIG. 2 is a vertical cross-sectional view of the embodiment of the high-temperature dry steam cooking utensil according to the present invention.
Figure 4:
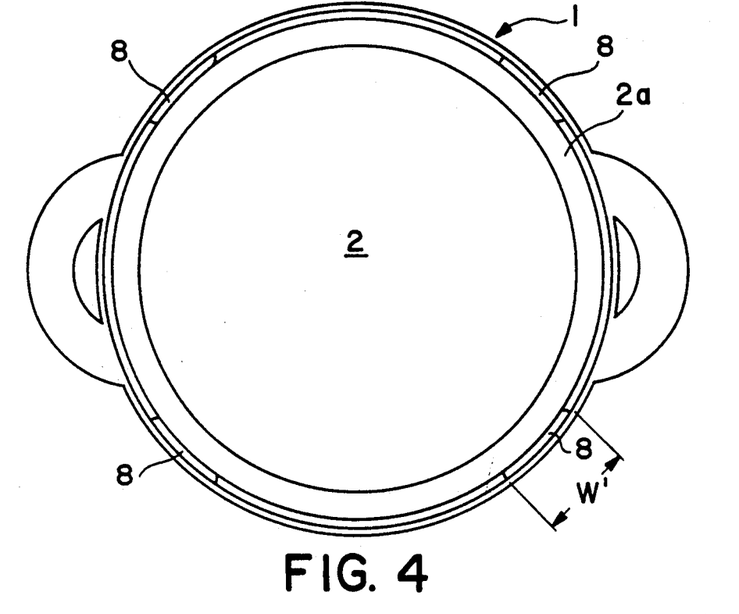
FIG. 4 is a plan view of the embodiment of the high-temperature dry steam cooking utensil with both its lid and steam baffle removed according to the present invention.
Figure 5:
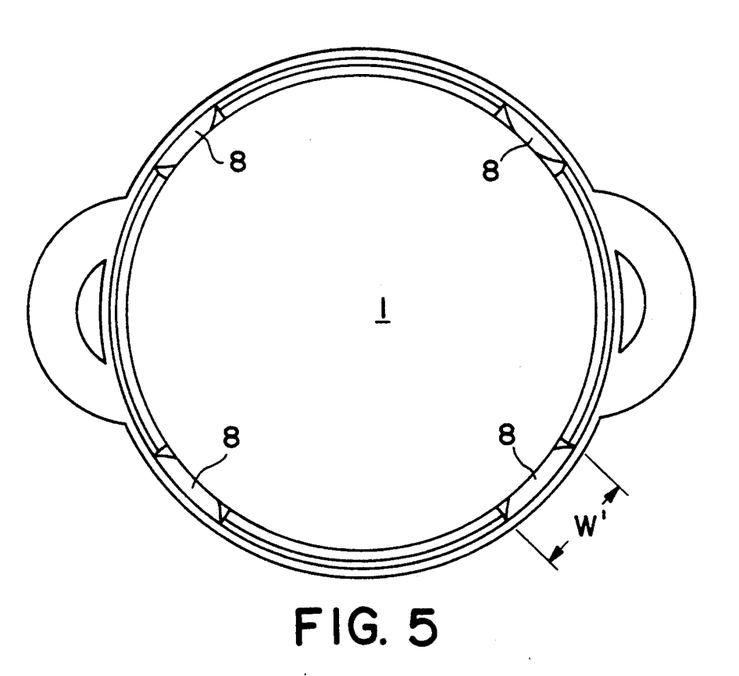
FIG. 5 is a plan view of a cooking pan of the embodiment of the high-temperature dry steam cooking utensil according to the present invention.

The stepped portions 5 and 6 formed on the top portion of the cooking pan 1 have four cutout portions equally spaced around and having a predetermined circular length W' thereacross as shown in FIGS. 1 and 5, and thus the inner wall of the cooking pan 1 there swell externally. With the tray 2 is seated in position as shown in FIGS. 2 and 4, steam paths 8 are formed between the circular edge of the tray 2 and the inner wall of the cooking pan 1. Although both stepped portions 5, 6 are not employed in FIGS. 2 and 4, the stepped portion 6 may be formed; for example, as the stepped portion 6, a bit of step form may be left to receive the steam baffle at its rim portion. In this case, however, at least, steam paths 8 are required between the tray 2 and the cooking pan 1.

Figure 3:
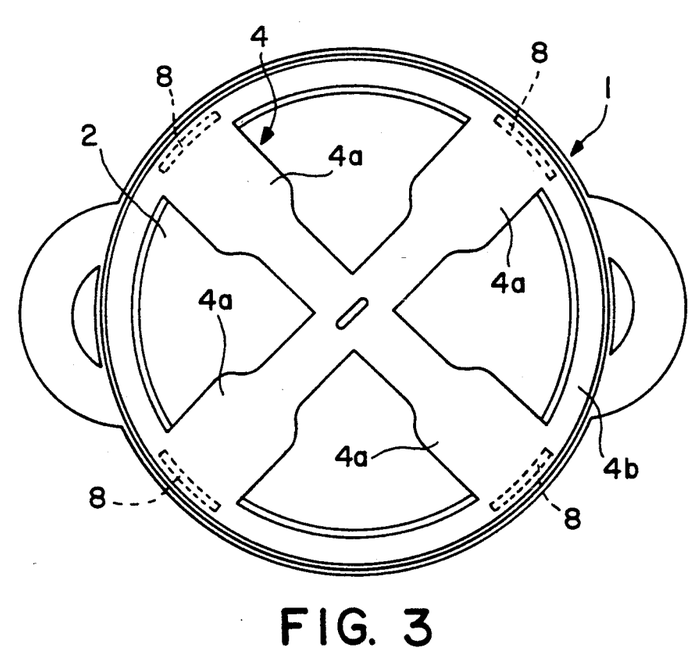
FIG. 3 is a plan view of the embodiment of the high-temperature dry steam cooking utensil with its lid removed according to the present invention.

In the embodiment illustrated in FIGS. 1 and 3, the steam baffle 4, disposed on the tray 2 and received by the stepped portion 6, is made up of guide segments 4a, each having a width W slightly greater than the length W' of the cutout portions 8. Each guide segment 4a extends inward, and joins the other guide segments at the center, shaping generally a cross configuration. The steam baffle 4 also has at its outer circular edge a plurality of ring segments 4b of fixed radial width, each connecting guide segments 4a. These segments are integrally formed into the steam baffle 4, which, as a unitary body, has a mechanical strength enough to keep its shape with its peripheral received at the stepped portion 6.

The guide segments 4a of the steam baffle 4 have inclined surfaces which are inclined upwardly toward the center in order to guide inwardly the steam which is squirted upward. On the way toward the center, the guides 4a have also downward-inclined surfaces which guide the steam toward the cooking material in the tray 2. The guide segments 4a are again inclined upwardly toward the center where all the guide segments 4a join. The primary purpose of the steam baffle 4 is to guide the steam downward. To achieve this purpose, the width W of each guide segment 4a from its peripheral to the downward inclined surface is set to W which is wider than W' of the cutout portions. Each guide segment 4a is then of narrow-width on the center portion. A small grip is provided at the center where the guide segments 4a join.

Figure 6:
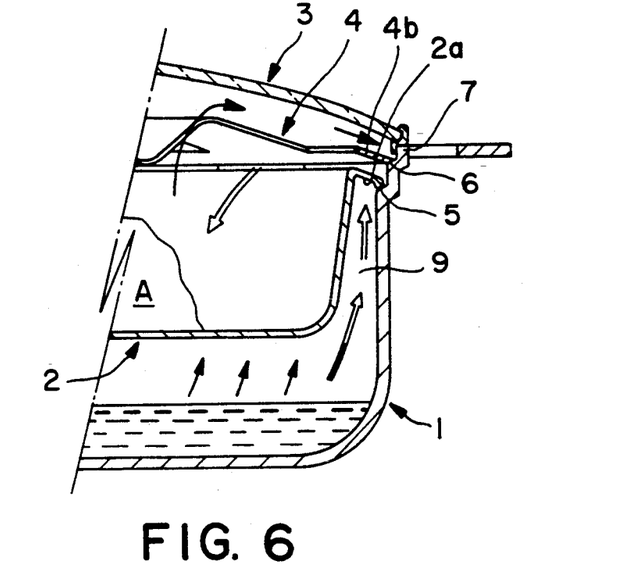
FIG. 6 is a vertical cross-sectional view, taken along a section of a portion in which no steam paths lie, of the embodiment of the high-temperature dry steam cooking utensil according to the present invention.
Figure 7:
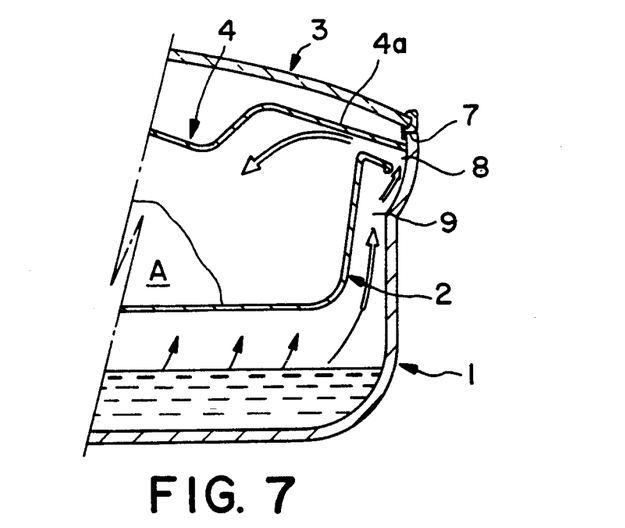
FIG. 7 is a vertical cross-sectional view, taken along a section of a portion in which a steam path lies, of the embodiment of the high-temperature dry steam cooking utensil according to the present invention.

FIGS. 6 and 7 illustrate the operational status of the cooking utensil according to the present invention. FIG. 6 is a cross-sectional view taken along the section of a portion where no steam paths lie in. FIG. 7 is a cross-sectional view taken along the section of a portion where a steam path lies in.

When the cooking pan 1, containing water as shown in FIG. 7, is heated by a hot plate or other heating means, wet steam evaporated from water rises in the space between the cooking pan 1 and the tray 2. In the present invention, the flange portion of the tray 2 is supported at its rim by the stepped portion 5 of the cooking pan 1, and a relatively large space which works as a steam reservoir, is formed between the outer wall of the tray 2 and the inner wall of the cooking pan 1. The steam in the space 9 working as a steam reservoir is then heated to high-temperature, dry steam, by the hot cooking pan 1. The high-temperature dry steam is then pushed upward through the steam paths 8 along the inner wall of the cooking pan 1 and then into the tray 2.

In a cooking pan having steam holes on the sides of its tray, evaporated wet steam may rise along the outer wall of the tray and may spout into the tray with its wetness unremoved. According to the present invention, however, the steam reservoir advantageously allows the steam to be fed into the tray 2 in a completely dry and high-temperature condition. The high-temperature dry steam squirted upward through the steam paths 8 is then routed along the guide segments 4a of the steam baffle 4 toward the cooking material A to heat it.

The steam once used to heat the cooking material A loses its heat to some degree, and new steam supplied every moment replaces it by pushing it upward through openings of the steam baffle 4. The used steam then changes into wet steam or waterdrops as it flows downwardly and externally along the underside of the lid 3. The wet steam and waterdrops are then fed back into the cooking pan 1 between the peripheral of the steam baffle and the inner wall of the cooking pan 1. Like many of commercial pan lids, the lid 3 is shaped into a semi-spherical form so that waterdrops sticking to the inner surface of the lid may flow toward its circular peripheral. Preferably, the lid may be made of transparent glass so that cooking status may be visible from outside to modify or adjust it if necessary. Since the flange 2a of the tray 2 is inclined externally downward, waterdrop and wet steam are fed back into the cooking pan 1 rather than into the tray 2. Waterdrops stick to or fall on the flange of the tray 2 may flow back to the cooking pan 1 through any convenient space, i.e., the steam paths 8.

Figure 8:
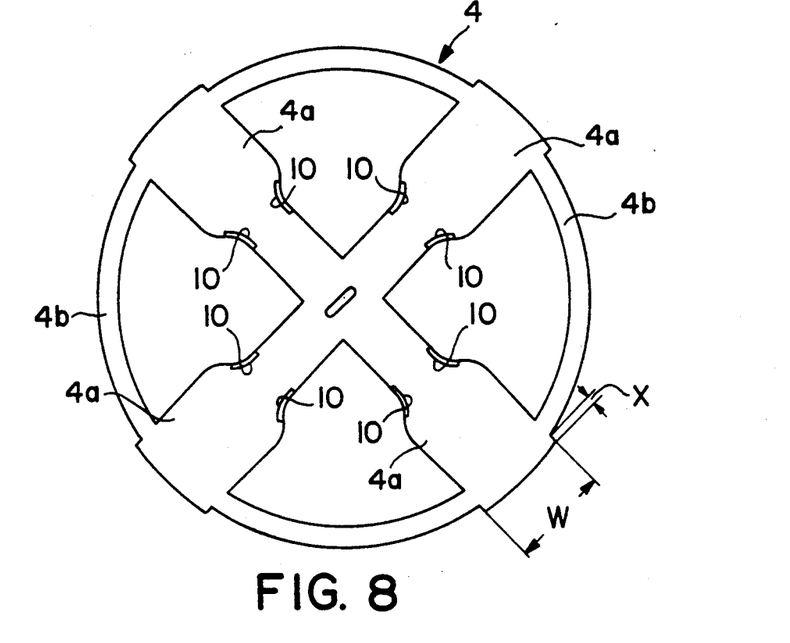
FIG. 8 is a plan view of a modified embodiment of the steam baffle of the high-temperature dry steam cooking utensil according to the present invention.
Figure 9:
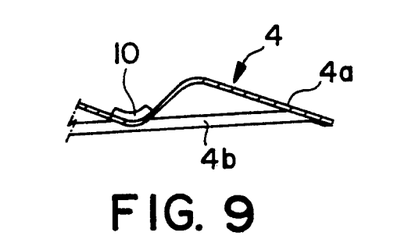
FIG. 9 is a partial vertical cross-sectional view of a guide segment of the embodiment of FIG. 8.

FIG. 8 is a modified embodiment of the steam baffle shown in FIG. 1. In this embodiment, the width W of each guide segment is set greater than the width of W' of the steam paths. Both side edges of each guide segment are received by the stepped portion 6 of the cooking pan 1. The peripheral edge of each guide segment is externally projected by X from the peripheral edge of the ring segments 4b. Each guide segment's V-shaped bottom portion, which is at least lowest level, is provided with a small vertical flange 10 at both sides so that no waterdrops fall therefrom.

As seen from FIG. 10, in this embodiment, feedback paths 11 are formed between the ring segments 4b and the cooking pan 1 when the steam baffle is seated into the cooking pan 1. This facilitates the feedback circulation of waterdrops and wet steam above the steam baffle and thus below the underside of the lid 3 into the cooking pan 1. Since the tray 2 and the steam baffle are surrounded by a saturated condition of high-temperature steam, it is unlikely that steam condensation and moisture evaporation take place thereon. When heating of the steam baffle begins possibly from its room-temperature at the initial stage of cooking, or when wet steam is fed back, slight amount of waterdrops may be produced on the baffle steam. The substantially vertical flanges 10 disposed on both sides of each guide segment at its bottom portion serves as a reservoir containing waterdrops on the baffle. Even slight amount of water is therefore prevented from entering into the cooking material A.

Figure 11:
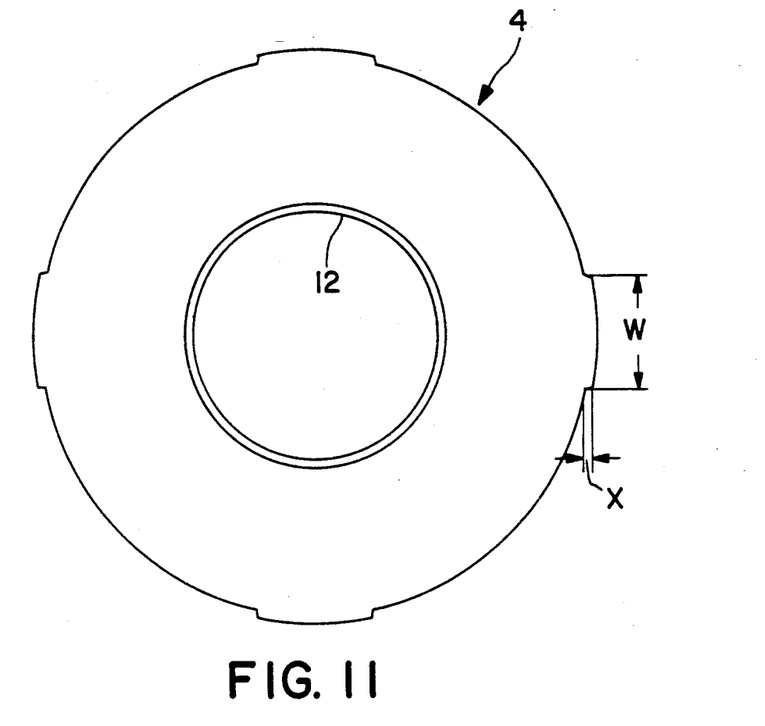
FIG. 11 is a plan view of another embodiment of a steam baffle of the high-temperature dry steam cooking utensil according to the present invention.

FIG. 11 illustrates another embodiment of the steam baffle. In this embodiment, the steam baffle is a ring-shaped (doughnut-shaped) one having a relatively long radial width. Viewed in its cross section in FIG. 12, the steam baffle has an upwardly inclined surface from the peripheral to guide inwardly the steam squirted out through the steam paths 8 facing the peripheral edge of the steam baffle, and a downwardly inclined surface inwardly to guide the steam toward the center of the tray, i.e., toward a cooking material A. The inner edge of the steam baffle is terminated in a slight rising 12, which serves as a reservoir.

Figure 12:
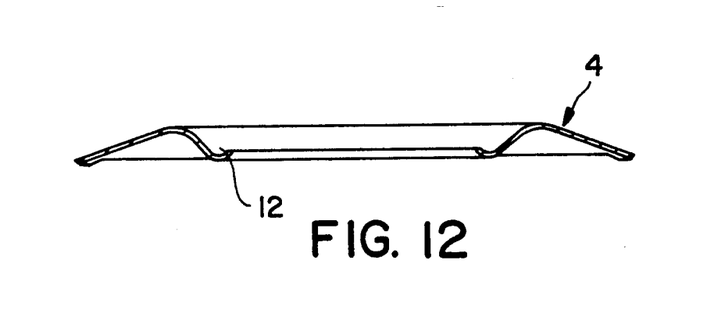
FIG. 12 is a vertical cross-sectional view of the steam baffle of FIG. 11.

The outer edge of the steam baffle is configured with the guide segments slightly projected outward from the ring segments in the same manner as in the previous embodiment; that is, the steam baffle has a larger diameter portion of guide segment which covers each steam path and a smaller diameter portion of ring segment which forms feedback paths, with a difference X between the larger diameter and the smaller diameter. In this embodiment, four projections with the dimension of X are formed in four different directions.

In the embodiment illustrated in FIGS. 11 and 12, high-temperature dry steam squirted out of the steam paths 8 stays in the space below the ring-shaped steam baffle 4 and then wet steam once used for cooking flows upward toward the space above the steam baffle; thus, the general flow of steam is relatively clearly separated, thereby achieving an efficient cooking. Accordingly, the general steam flow is streamlined: below the steam baffle, the steam flows inwardly from the peripheral and above the steam baffle the steam flows outwardly from the center. This structure advantageously avoids mixing high-temperature dry steam with relatively low temperature wet steam.

In the embodiment shown in FIG. 11, the steam baffle may be of a constant outer diameter on all around, i.e., may be a complete circle. In this case, waterdrops and wet steam taking place above the steam baffle may be fed back into the cooking pan via the peripheral circular gap. Preferably, some form of feedback paths may be incorporated to facilitate the feedback action of steam.

Figure 13:
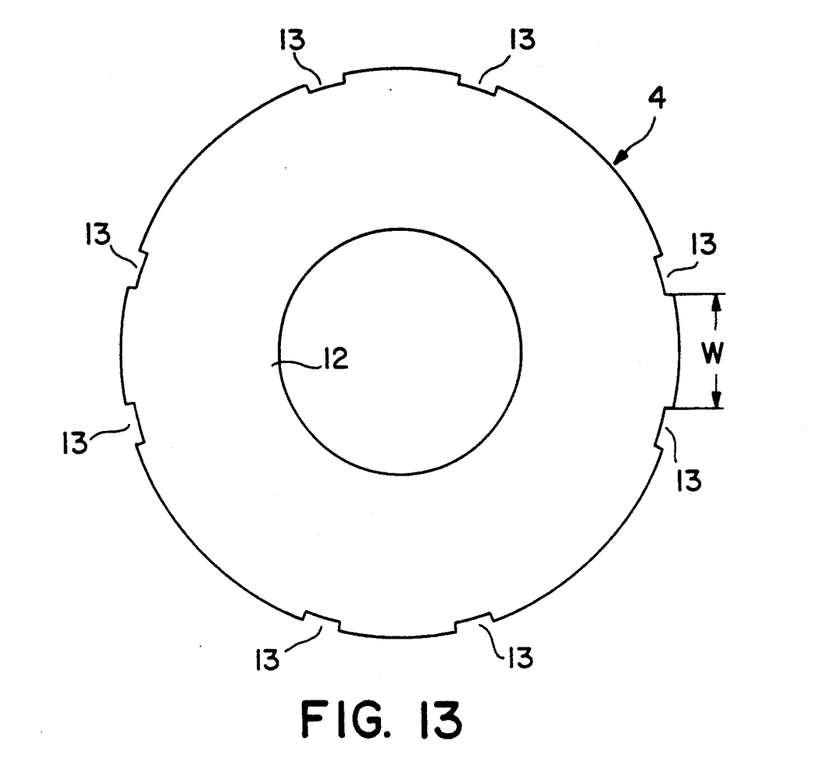
FIG. 13 is a plan view of a modified embodiment of the steam baffle of FIG. 11.
Figure 14:
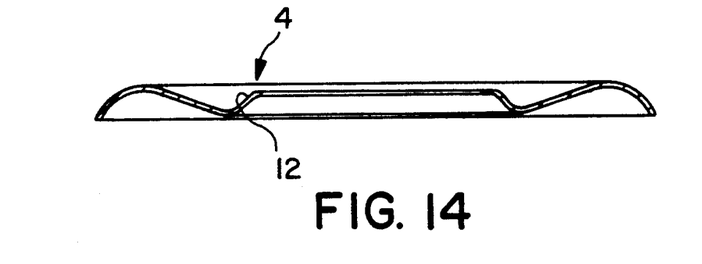
FIG. 14 is a vertical cross-sectional view of the steam baffle of FIG. 13.

FIG. 13 shows an embodiment in which cutout portion 13 are formed on each segment, corresponding to each steam path, of the outer edge of the steam baffle. The cutout portions 13 work as a feedback path. In this embodiment, a cooking space where high-temperature dry steam is active is more clearly separated from a feedback space where wet steam exists. In this structure, moisture flows on the steam baffle toward its peripheral, falls onto the stepped portion 6 nearby the steam paths 8, then circulates back to the cooking pan 1 via the steam paths. This circulation is smoothly performed.

In the high-temperature dry steam cooking pan according to the present invention, water is evaporated into steam which is circulated inside the cooking pan. When the internal pressure increases inside the cooking pan, the lid is naturally pushed up causing some amount of steam to escape out of the pan. The cooking pan according to the present invention, however, reduces steam escaping out of the pan and minimizes heat loss involved, thereby allowing foods to be cooked in an efficient and quick manner. The high-temperature dry steam cooking pan provides sufficient cooking capability with modest heating power.

A marginal portion of water which is fed into the cooking pan disperses, and thus the water may be used repeatedly; there is little change that the cooking pan is heated in a dry condition with no water inside.

In the high-temperature dry steam cooking pan according to claim 1 of the present invention, when the pan is heated with water inside the cooking pan and with a cooking material set inside the tray, the water inside the cooking pan evaporates into steam which is then heated to a high-temperature dry state as it rises between the tray and the cooking pan. The high-temperature dry steam is then guided toward the cooking material in the tray via the steam paths. The steam used for cooking changes into wet steam and waterdrops, which, in turn, are fed back to the cooking pan. This circulation is repeated. This allows the cooking material in the tray to be cooked by a constant-temperature atmosphere saturated with high-temperature dry steam in an efficient and quick manner. The cooking material is thus heated uniformly deep inside, and is not subjected to unnecessarily high temperature; thus no scorching takes place.

Without adding water in particular, such as tap water, to the cooking material, the cooking material's own moisture may be used for cooking subjected to a high temperature. Since, during cooking, no condensed water of steam drops into the tray accommodating thereon the cooking material, cooking material's own flavor may be preserved. Nutrients, vitamins, magnesium which is water-soluble, and the like may be preserved as well.

According to claim 2 of the present invention, the steam baffle may be of a relatively simple shape having a mechanical strength as a unitary structure.

According to claim 3 of the present invention, wet steam and waterdrops resulted from steam in the course of cooking are fed back into the cooking pan in a smooth manner.

According to claim 4 of the present invention, even a small amount of waterdrops which possibly stick onto the steam baffle is prevented from entering the tray.

According to claim 5 of the present invention, a heating space where high-temperature dry steam is active may be separated from a feedback space where wet steam and waterdrops exist; thus, thermal efficiency may be enhanced and the steam baffle may be maintained in its proper form.

According to claims 6 and 7 of the present invention, a cooking space where high-temperature dry steam is active is properly separated from a feedback space where wet steam and moisture exist; thus, the feedback of wet steam and moisture are carried out inside the cooking pan in a smooth manner.

What is claimed is:

1. A high-temperature dry steam cooking utensil comprising a cooking pan for containing water therein, a tray having, at its entire top circular edge, a flange projecting externally and inclined downward, for accommodating thereon a cooking material, a lid for covering the top of the cooking pan, and a steam baffle, wherein
   at the top portion of the cooking pan there are formed, in the ascending order, a first stepped portion for receiving the rim of the flange of the tray, a second stepped portion for receiving the steam baffle, and a third stepped portion for receiving the lid; steam paths are formed at a plurality of locations around the peripheral of the tray by cutting partially the first stepped portion, between the peripheral of the tray and the inner wall of the cooking pan; and the steam baffle has guide segments for guiding steam passing out of the steam paths toward the cooking material accommodated in the tray.

2. The high-temperature dry steam cooking utensil according to claim 1, wherein the steam baffle is integrally formed of a plurality of guide segments, each covering a steam path and extending toward the center, and fixed-width ring segments, each connecting the guide segments.

3. The high-temperature dry steam cooking utensil according to claim 2, wherein the width of the guide segments at its outer edge across is greater than the width of the steam paths, each guide segment is received, at its both side edges, by the second stepped portion, and the diameter of the ring segments across the steam baffle is set smaller than the diameter of the guide segments across the steam baffle, forming feedback paths with the cooking pan.

4. The high-temperature dry steam cooking utensil according to claim 2, wherein a flange portion is provided at both side edge of, at least, lowest portion of each guide segment extending toward the center in order to prevent waterdrops from falling therefrom.

5. The high-temperature dry steam cooking utensil according to claim 1, wherein the steam baffle is a relatively wide radial length ring, having inclined surfaces inwardly from its outer edge so that steam passing the steam paths is guided downwardly, and a rising portion is formed at the inner circular edge.

6. The high-temperature dry steam cooking utensil according to claim 5, wherein the ring-shaped steam baffle has a larger diameter where the baffle covers, with its each projected portions, one of the steam paths, each projected portion being wider than the width of each steam path, and a smaller diameter at the remaining circular portions with no projected portions, whereby feedback paths are formed between the peripheral of the baffle and the cooking pan.

7. The high-temperature dry steam cooking utensil according to claim 5, wherein the steam baffle has, on its peripheral portion, cutouts to be used as feedback paths, each cutout on both side of each peripheral portion which correspondingly covers each steam path.

* * * * *